Figure 1:
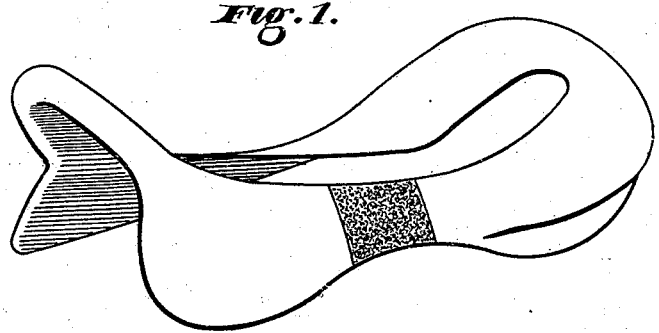

P. B. HORTON.
SADDLE-TREE.

No. 174,135. Patented Feb. 29, 1876.

Witnesses
Geo. H. Strong.
John L. Boone

Inventor
Pemberton B. Horton
by Davey & G.
Atty s.

UNITED STATES PATENT OFFICE.

PEMBERTON B. HORTON, OF SAN FRANCISCO, CALIFORNIA.

IMPROVEMENT IN SADDLE-TREES.

Specification forming part of Letters Patent No. 174,135, dated February 29, 1876; application filed June 8, 1875.

*To all whom it may concern:*

Be it known that I, PEMBERTON B. HORTON, of San Francisco city and county, State of California, have invented an Improved Saddle-Tree; and I do hereby declare the following description and accompanying drawings are sufficient to enable any person skilled in the art or science to which it most nearly appertains, to make and use my said invention or improvement without further invention or experiment.

My improvement consists in the manufacture of saddle-trees out of a composition composed of paper-pulp, commonly called "papier-maché," and some woody fiber or dust.

In the manufacture of my improved trees, I take the papier-maché, and mix with it a quantity of cork-dust, wooden or other vegetable fiber, or two or more of these substances, and then form it into the desired shape by compression in molds. I prefer to use a mixture of papier-maché, cork dust or cork shavings, and sawdust, as these ingredients, when compressed into the proper or desired form, make a very strong saddle-tree, and by using more or less of the vegetable fiber the weight of the saddle-tree can be regulated as desired. A saddle-tree having all the strength and durability of a wooden one can thus be manufactured at a comparatively small cost, and when covered with rawhide, in the usual way, it is impossible to distinguish them from the ordinary wooden tree.

Having thus described my invention, what I claim, and desire to secure by Letters Patent, is—

As a new article of manufacture, saddle-trees made of a mixture of paper-pulp and cork dust or shavings compressed to the desired shape in molds.

PEMBERTON B. HORTON.

Witnesses:
GEO. H. STRONG,
JNO. L. BOONE.